United States Patent [19]

Jacquemin et al.

[11] Patent Number: 5,439,975

[45] Date of Patent: Aug. 8, 1995

[54] THERMOPLASTIC POLYETHERAMIDE/STYRENE COPOLYMER COMPOSITION

[75] Inventors: Jean-Pierre Jacquemin, Bernay; Gerard Deleens, Beaumesnil, both of France

[73] Assignee: Atochem, Puteaux, France

[21] Appl. No.: 71,611

[22] Filed: Jun. 4, 1993

Related U.S. Application Data

[63] Continuation of Ser. No. 895,250, Jun. 8, 1992, abandoned, which is a continuation of Ser. No. 693,090, Apr. 30, 1991, abandoned, which is a continuation of Ser. No. 338,567, Apr. 14, 1989, abandoned, which is a continuation of Ser. No. 942,185, Dec. 16, 1986, abandoned.

[30] Foreign Application Priority Data

Dec. 16, 1985 [FR] France .................... 85 18599

[51] Int. Cl.⁶ .................................... C08L 77/12
[52] U.S. Cl. .................................. 525/89; 525/88; 525/92; 525/167; 525/184
[58] Field of Search .............. 525/92, 167, 88, 89

[56] References Cited

U.S. PATENT DOCUMENTS

| | | | |
|---|---|---|---|
| 4,085,163 | 4/1978 | Gergen et al. | 525/92 |
| 4,659,765 | 4/1987 | Liu et al. | 524/447 |
| 4,716,198 | 12/1987 | Murabayashi | 525/92 |

FOREIGN PATENT DOCUMENTS

| | | | |
|---|---|---|---|
| 842309 | 5/1970 | Canada | |
| 0179700 | 4/1986 | European Pat. Off. | 525/92 |
| 0115337 | 9/1981 | Japan | 525/92 |
| 0068385 | 4/1984 | Japan | 525/92 |
| 0170646 | 9/1985 | Japan | 525/184 |

OTHER PUBLICATIONS

Chemical Abstracts vol. 77, 1972, p. 76, 76544r.

*Primary Examiner*—Ana L. Carrillo
*Attorney, Agent, or Firm*—Burns, Doane, Swecker & Mathis

[57] ABSTRACT

Improved thermoplastic compositions adopted for easy conversion, e.g., by injection molding or extrusion techniques, into useful shaped articles having high flexibility, and good tear resistance and elasticity, include a polyetheramide, advantageously a polyetheresteramide, and a styrene/diene copolymer, e.g., a copolymer of styrene with butadiene or isoprene, notably a linear or branched chain styrene/butadiene/styrene or styrene/isoprene/styrene copolymer.

9 Claims, 1 Drawing Sheet

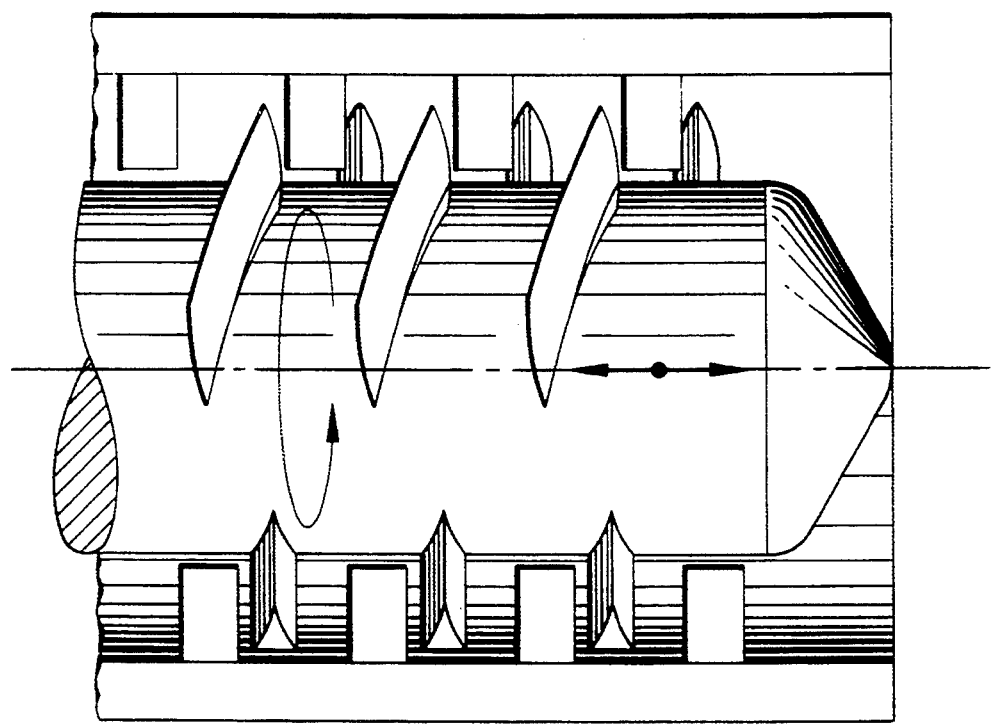

THERMOPLASTIC POLYETHERAMIDE/STYRENE COPOLYMER COMPOSITION

This application is a continuation of application Ser. No. 07/895,250, filed Jun. 8. 1992, now abandoned, which is a continuation of application Ser. No. 07/693,090, filed Apr. 30, 1991, now abandoned, which is a continuation of application Ser. No. 07/338,567, filed Apr. 14, 1989, now abandoned, which is a continuation of application Ser. No. 06/942,185, filed Dec. 16, 1986, now abandoned.

SUMMARY OF THE INVENTION

The present invention relates to novel thermoplastic polymeric compositions of matter, and, more especially, to such novel compositions comprising a blend of a copolyetheramide and a styrene/diene copolymer.

Briefly, the present invention features the unexpected discovery that the polyetheramides and styrene/diene copolymers are essentially completely miscible in the molten state, in all proportions, and upon cooling yield certain homogeneous thermoplastic compositions easily and readily converted into molded shaped articles, e.g., by injection, extrusion or compression molding techniques into tubes, films, cable coatings, and the like.

The subject compositions may also be reduced into a powdery state by cryogenic grinding, said powders then being used to coat metals by electrostatic projection or by fluidized bed immersion coating.

The shaped articles resulting from the conversion of the subject compositions have desirable and valuable physical and chemical properties, in particular high flexibility, low hardness, good tear resistance, good elasticity, and properties especially of interest to the automotive and shoe industries, and very many others.

In addition, these properties may be varied over wide limits by changing the nature and type of each of the polyetheramide and styrene/diene copolymer components and the respective properties thereof.

The novel compositions of this invention are comprised of from 0.1 to 99.9% by weight of polyetheramide and from 99.9 to 0.1% by weight of the styrene/diene copolymer.

BRIEF DESCRIPTION OF THE DRAWING

The FIGURE of Drawing is a schematic view, partially in cross-section, of mixing apparatus suitable for formulating the novel compositions of the invention.

DETAILED DESCRIPTION OF THE PREFERRED EMBODIMENTS OF THE INVENTION

More particularly according to the present invention, by the term "polyetheramide" are intended both the statistical polyetheramides (namely, those having random chain lengths of their different monomeric constituents) and sequential polyetheramides comprising recurring polyetheramide sequences constituted by block segments of varying chain lengths of the different constituents thereof, e.g., polyamide blocks and polyether blocks.

Sequential polyetheramides result from the copolycondensation of polyamide sequences having reactive end groups, with polyether sequences having reactive end groups, such as, for example:

(1) Polyamide sequences having terminal amino groups at each end of the polymer chain with polyoxyalkylene sequences having terminal carboxylic acid groups at each end of the polyether chain;

(2) Polyamide sequences having terminal carboxylic acid groups at each end of the polyamide chain with polyoxyalkylene sequences having terminal amino groups at each end of the polyether chain, prepared by cyanoethylation and hydrogenation of aliphatic alpha, omega-dihydroxy polyoxyalkylenes, designated polyetherdiols; and (3) Polyamide sequences having terminal carboxylic acid groups at each end of the polyamide chain with such polyetherdiols, the resulting polyetheramides being polyetheresteramides.

The composition and preparation of such polyetheresteramides is described in French Patents Nos. 74.18913 and 77.26678, and in U.S. Pat. Nos. 4,331,786 and 4,332,920, assigned to the assignee hereof and incorporated herein by reference. Representative such polyetheresteramides to be blended with the styrene/diene copolymers advantageously have a molecular weight in excess of 10,000, a melting point of from 80° to 210° C., and are comprised of from about 85 to 15% by weight of carboxylated polyamide or copolyamide blocks having a molecular weight of from about 300 to 15,000, desirably from about 600 to 5,000, and from about 15 to 85% by weight of hydroxylated polyether blocks having a molecular weight of from about 100 to 6,000, desirably from about 200 to 3,000. Exemplary polyamides are nylon 6, nylon 11 and nylon 12, and a representative polyetherdiol is polyoxytetramethylene glycol.

By "styrene/diene" copolymer is intended any polymer resulting from the copolymerization of styrene and one or more dienes copolymerizable therewith, such as isoprene, butadiene, and the like.

In a preferred embodiment of the invention, by "styrene/diene" copolymer is intended any sequential copolymer of styrene and butadiene or isoprene, the median chain or chains of which are polydienes and the terminal chains of which are polystyrenes, designated as copolymers of S-B-S or S-I-S type.

These may be prepared by solution copolymerization, utilizing anionic catalysis, of styrene and butadiene or isoprene; depending upon the coupling agent used, these will either be linear or branched.

The styrene/diene copolymers may contain extender oils, which increase flexibility.

In another embodiment of the invention, different polyetheramides and different sequential copolymers may be mixed together.

In addition to the two essential components, the compositions of the invention may also contain the typical additives and adjuvants, e.g., colorants, plasticizers, heat and/or light stabilizers, fillers, and the like.

Exemplary of the plasticizers, representative are the sulfonamides (more particularly, butylbenzene sulfonamide) and 2-ethylhexyl-para-hydroxybenzoate, known plasticizers for the polyetheramides.

The compositions of the invention are prepared by intermixing the two components in the molten state and cooling the admixture which results.

The mixing temperature must be such that the two components are in the molten state, obviously without decomposition of the component most sensitive to heat.

The mixer used for this operation may be supplied with a mixture, previously prepared at ordinary temperatures, of the polyetheramide and the copolymer, or the mixer may be supplied continuously with each of the two components.

Good mixing is absolutely necessary, but excessively vigorous mixing is harmful, if a copolymer with a strong cross-linking tendency is used, which is the case with linear trisequential styrene/butadiene/styrene, as both vigorous mixing and temperature accelerate the cross-linking thereof, resulting in an excess of highly viscous, heterogeneous product.

Good results are obtained by using a mixer (for example, a double screw extruder or a co-mixer) providing, at the working temperature selected, a shear rate essentially equal to 2000 sec$^{-1}$.

In order to further illustrate the present invention and the advantages thereof, the following specific examples are given, it being understood that same are intended only as illustrative and in nowise limitative.

In said examples to follow, the compositions were formulated in a "co-mixer" marketed by the Swiss company BUSS AG, of type PR 46.

This apparatus is characterized in that it has a single screw with a discontinuous thread, with each turn of the thread being interrupted by three notches, and the remaining parts of the thread constituting the mixing blades (see the FIGURE of Drawing).

Furthermore, simultaneously with one complete rotation, the screw undergoes an axial reciprocating motion.

This co-mixer, which provides the shearing rate specified above, is continuously supplied by means of a helical screw metering feeder, with preprepared admixture of dry polyetheramide granules, granular or powdered styrene/diene copolymer, and various stabilizers.

The first degassing well, located in the center of the co-mixer remains unused, while a vacuum of 500 torr is applied to the second well located ⅔ of the way along its length, to eliminate traces of water that may be present.

Being equipped at its distal end with a multiple hole die, i.e., four orifices 4 mm in diameter, the mixer produces a plurality of liquid streams which are solidified and cooled by immersion in a water tank, prior to being conveyed to a granulator.

The granules obtained were used, after suitable drying and determination of melt index according to ASTM D 1238 (expressed in g/10 mm) to mold the specimens required for the different tests that were carried out, to determine certain properties of the resultant compositions.

In this manner, the following were measured:
(i) Shore D hardness according to ASTM D 1484;
(ii) Tensile stress expressed in MPa and elongation at rupture in percent, according to ASTM D 638;
(iii) Maximum bending deflection in mm, maximum bending stress in MPa and bending modulus in MPa, in bending tests according to ASTM D 790;
(iv) Tear strength, expressed in KNm$^{-1}$ on notched and unnotched specimens, in the direction parallel to injection, according to the ISO 34 standard.

The following component materials were used in the examples which follow:

POLYETHERAMIDE

Three polyetheramides were used, namely:

The first, designated by the abbreviation Pa 12 PTMG-1, was prepared by polycondensation according to the technique described in French Patent No. 74.18913, of 33 parts by weight of a terminally dicarboxylated polyamide 12 prepolymer (obtained from lauryllactam and adipic acid) having a molecular weight of 600, with 67 parts by weight of polyoxytetramethylene glycol (PTMG) having a molecular weight of 2,000, with the resulting polyetheresteramide having an inherent viscosity of 1.80 dl.g$^{-1}$, measured at 25° C. of a solution of 0.5 g polymer in 100 g meta-cresol.

The second, Pa 12 PTMG-2, prepared by polycondensation, in the same manner, of 30 parts by weight of the adipic polyamide 12, having a molecular weight of 850, with 70 parts of PTMG, having a molecular weight of 2,000.

It had an inherent viscosity of 1.80 dl.g$^{-1}$.

The third, Pa 6 PPG, was prepared by polycondensation of 80 parts of terminally dicarboxylated polyamide 6 prepolymer (from caprolactam and adipic acid) having a molecular weight of 2,300, with 20 parts of polyoxypropylene glycol (PPG) having a molecular weight of 600.

It had an inherent viscosity of 1.20 dl.g$^{-1}$.

STYRENE/DIENE COPOLYMER

The four styrene/diene copolymers used were products commercially available from Shell under the trademark CARIFLEX TR, i.e.:

TR 1102, a linear trisequential S-B-S polymer, 28% styrene and 72% butadiene, referred to hereinafter as S-B-S lin. 28–72;

TR 1107, a linear trisequential S-I-S polymer, 14% styrene and 86% isoprene, referred to hereinafter as S-I-S lin. 14–86;

TR 4203, a branched trisequential S-B-S polymer, 35% styrene and 65% butadiene, containing 33.5% by weight of extender oil, referred to hereinafter as S-B-S ram. 35–65.

TR 4122, a linear trisequential S-B-S polymer, 50% styrene and 50% butadiene, containing 35.5% by weight of extender oil, referred to hereinafter as S-B-S lin. 50—50.

In addition to these two essential components, the following stabilizers were included:

Heat: IRGANOX 1076 and PS 800, marketed by Ciba-Geigy.

Light: TINUVIN 350, also marketed by Ciba-Geigy.

EXAMPLE 1

The co-mixer was continuously supplied with a mixture, prepared beforehand in a barrel mixer, of:
(i) 30 parts by weight of Pa 12 PTMG 1 granules;
(ii) 70 parts by weight of S-B-S lin. 28–72 granules;
(iii) 0.2 parts by weight of IRGANOX 1076;
(iv) 0.1 parts by weight of IRGANOX PS 800; and
(v) 0.2 parts by weight of TINUVIN 350.

The temperatures prevailing in the co-mixer, measured in 6 zones, were the following, from inlet to outlet:

165° C.—165° C.—180° C.—180° C.—185° C.—170° C.

The shear rate was essentially equal to 2,000 sec$^{-1}$.

Using a speed of rotation of the screw of 150 rpm, the hourly output was approximately 20 kg.

EXAMPLES 2, 3, 4, 5 AND 6

In similar manner, five other compositions were also prepared, the characteristics of which are reported in Table 1.

After measuring the melt index of the granules, specimens were injection molded at temperatures of from 190° to 210° C., and the physical properties of these compositions were measured and are reported in Table 2.

It was found that by varying the nature and the proportions of the two principal components, compositions having highly different properties were produced.

TABLE 1

|  | POLYETHERAMIDE | | COPOLYMER | | IRG. 1076 | IRG. 800 | TIN. 350 | TEMPERATURES IN THE CO-MIXER | | | | | |
| --- | --- | --- | --- | --- | --- | --- | --- | --- | --- | --- | --- | --- | --- |
|  | NATURE | PARTS | NATURE | PARTS | | | | | | | | | |
| Example 1 | Pa 12 PTMG-1 | 30 | SBS lin. 28–72 | 70 | 0.2 | 0.1 | 0.2 | 165° | 165° | 180° | 180° | 185° | 170° |
| Example 2 | Pa 12 PTMG-1 | 70 | SBS lin. 28–72 | 30 | 0.2 | 0.1 | 0.2 | 165° | 165° | 185° | 180° | 185° | 175° |
| Example 3 | Pa 12 PTMG-1 | 80 | SIS lin. 14–86 | 20 | 0.2 | 0.1 | 0.2 | 165° | 170° | 180° | 180° | 185° | 175° |
| Example 4 | Pa 12 PTMG-1 | 50 | SBS ram. 35–65 | 50 | 0.2 | 0.1 | 0.2 | 155° | 165° | 170° | 170° | 170° | 160° |
| Example 5 | Pa 12 PTMG-2 | 70 | SBS lin. 50—50 | 30 | 0.2 | 0.1 | 0.2 | 170° | 180° | 180° | 185° | 185° | 175° |
| Example 6 | Pa 6 PPG | 85 | SBS lin. 28–72 | 15 | 0.2 | 0.1 | 0.2 | 180° | 190° | 195° | 190° | 190° | 195° |

TABLE 2

|  | MELTING INDEX | | HARDNESS SHORE A | TENSILE TESTS | | BENDING TESTS | | | TEAR RESISTANCE KNm$^{-1}$ | |
| --- | --- | --- | --- | --- | --- | --- | --- | --- | --- | --- |
|  | at 190° C. 5 kg | at 230° C. 2.16 kg | | Stress in MPa | Elongation % | Deflection in mm | Stress in MPa | Modulus in MPa | Without Notch | With Notch |
| Example 1 | 5.9 | | 71–70 | 10.2 | 740 | 21.9 | 1.7 | 31.6 | 48 | 46 |
| Example 2 | 13.0 | | 75–74 | 11.4 | 500 | 24.5 | 1.1 | 16.6 | 46 | 41 |
| Example 3 | 20.9 | | 71–70 | 9.9 | 430 | 25.1 | 0.9 | 15.3 | 52 | 38 |
| Example 4 | 12.9 | | 68—68 | 8.5 | 600 | 26.3 | 1.0 | 15.3 | 40 | 33 |
| Example 5 | 12.8 | | 82–79 | 12.5 | 700 | 26.0 | 1.4 | 18.2 | 45 | 41 |
| Example 6 | | 37.0 | 95–96 | 35.5 | 420 | 23.0 | 14.0 | 280 | 55 | 48 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermoplastic polymeric composition of matter, comprising an aliphatic polyetheresteramide block polymer and a styrene/diene copolymer consisting essentially of styrene and diene, wherein the aliphatic polyetheresteramide block polymer is the predominant component of the polymeric composition relative to the styrene/diene copolymer.

2. The composition of matter as defined by claim 1, said styrene/diene copolymer consisting essentially of styrene and butadiene or isoprene.

3. The composition of matter as defined by claim 1, said polyetheresteramide block copolymer comprising the copolycondensation polymerizate of a polyamide having carboxylic acid end groups with a polyoxyalkylene polyether having hydroxyl end groups.

4. The composition of matter as defined by claim 3, said terminally carboxylated polyamide having a molecular weight of from about 600 to 5000 and said terminally hydroxylated polyoxyalkylene polyether having a molecular weight of from about 200 to 3000.

5. The composition of matter as defined by claim 4, said polyetheresteramide block copolymer comprising from about 85 to 15% by weight of the polyamide and from about 15 to 85% by weight of the polyether.

6. The composition of matter as defined by claim 5, said polyamide comprising nylon 6, nylon 11 or nylon 12.

7. The composition of matter as defined by claim 2, said styrene/diene copolymer being a linear or branched chain styrene/butadiene/styrene or styrene/isoprene/styrene polymer.

8. A homogeneous melt of the composition of matter as defined by claim 1.

9. A molded shaped article comprising the composition of matter as defined by claim 1.

* * * * *